US007747419B2

(12) United States Patent
Lin et al.

(10) Patent No.: US 7,747,419 B2
(45) Date of Patent: Jun. 29, 2010

(54) PREDICTION METHOD OF NEAR FIELD PHOTOLITHOGRAPHY LINE FABRICATION USING BY THE COMBINATION OF TAGUCHI METHOD AND NEURAL NETWORK

(75) Inventors: Zone-Ching Lin, Taipei (TW); Ching-Been Yang, Taoyuan County (TW)

(73) Assignee: National Taiwan University of Science and Technology, Taipei (TW)

( * ) Notice: Subject to any disclaimer, the term of this patent is extended or adjusted under 35 U.S.C. 154(b) by 624 days.

(21) Appl. No.: 11/760,795

(22) Filed: Jun. 11, 2007

(65) Prior Publication Data

US 2008/0222067 A1    Sep. 11, 2008

(30) Foreign Application Priority Data

Mar. 7, 2007    (TW) .............................. 96107810 A

(51) Int. Cl.
 G06G 7/48  (2006.01)
 G06F 7/60  (2006.01)
 G06F 17/10 (2006.01)
 G05B 13/02 (2006.01)
 G06F 15/18 (2006.01)
 G06N 3/00  (2006.01)
 G06N 3/12  (2006.01)

(52) U.S. Cl. ................... 703/6; 703/2; 706/13; 706/15; 706/21; 700/44; 700/48

(58) Field of Classification Search ................. 706/13, 706/15, 21; 703/2, 6; 700/44, 48
See application file for complete search history.

(56) References Cited

U.S. PATENT DOCUMENTS

| 5,255,342 | A | * | 10/1993 | Nitta .......................... 704/200 |
| 5,311,421 | A | * | 5/1994 | Nomura et al. ............... 700/37 |
| 5,519,605 | A | * | 5/1996 | Cawlfield .................... 700/31 |
| 6,366,822 | B1 | * | 4/2002 | Heavlin ....................... 700/31 |
| 6,708,073 | B1 | * | 3/2004 | Heavlin ...................... 700/121 |

OTHER PUBLICATIONS

"A Neutral-Taguchi-Based Quasi Time-Optimization Control Srtategy for Chemical-Mechanical processes" by Wang, et al., Int. J Adv. Manuf. Technol. (2005) 26; pp. 759-765, Aug. 17, 2005.*
"Applying ANN/GA Algorithm to Optimize the High Fill-Factor Microlens Array Fabrication Using UV Proximity Printing Process"; by Hung et al.; Journal of Micromechanics and Microengineering, pp. 2388-2398; Nov. 14, 2005.*

* cited by examiner

*Primary Examiner*—Ramesh B Patel
(74) *Attorney, Agent, or Firm*—Jianq Chyun IP Office

(57) ABSTRACT

A method of building a set of experimental prediction model that requires fewer experimental frequency, shorter prediction time and higher prediction accuracy by using the advantages of combining the experimental data of Taguchi method and neural network learning is disclosed. The error between the experimentally measured result of photolithography and the simulated result of the theoretical model of near field photolithography is set as an objective function of an inverse method for back calculating fiber probe aperture size, which is adopted in the following Taguchi experiment. The analytical result of Taguchi neural network model of the present invention proves that the Taguchi neural network model can provide more accurate prediction result than the conventional Taguchi network model, and at the same time, improve the demerit of requiring massive training examples of the conventional neural network.

7 Claims, 10 Drawing Sheets

| Control factor | A. Probe Aperture PA (nm) | B. Exposure Energy/μm ee (nJ/μm) | C. Developing Time DT (sec) |
|---|---|---|---|
| Level 1 | 142 | 25 | 1 |
| Level 2 | 178 | 30 | 1.5 |
| Level 3 | 235 | 35 | 2 |

FIG. 3

|  | $ee_1 = 25$ nJ/μm | $ee_2 = 30$ nJ/μm | $ee_3 = 35$ nJ/μm |
|---|---|---|---|
| $EP_1 = 33$ nw | $EV_{11} = 33/25 = 1.32$ | $EV_{12} = 33/30 = 1.1$ | $EV_{13} = 33/35 = 0.94$ |
| $EP_2 = 41$ nw | $EV_{21} = 41/25 = 1.64$ | $EV_{22} = 41/30 = 1.37$ | $EV_{23} = 41/35 = 1.17$ |
| $EP_3 = 52$ nw | $EV_{31} = 52/25 = 2.08$ | $EV_{32} = 52/30 = 1.73$ | $EV_{33} = 52/35 = 1.49$ |

FIG. 4

| Run | A. Probe Aperture PA (nm) | B. Exposure Energy/μm ee (nJ/μm) | C. Developing Time DT (sec) | Half height line width FWHM1 | Half height line width FWHM2 | Half height line width FWHM3 | Mean FWHM | S (Standard Deviation) | S/N (dB) |
|---|---|---|---|---|---|---|---|---|---|
| 1 | 142 | 25 | 1 | 92.8 | 93.4 | 97.2 | 94.47 | 2.39 | −39.5083 |
| 2 | 142 | 30 | 1.5 | 97.6 | 103.4 | 107.4 | 102.8 | 4.93 | −40.2498 |
| 3 | 142 | 35 | 2 | 99.6 | 106.8 | 112.2 | 106.2 | 6.32 | −40.5379 |
| 4 | 178 | 25 | 1.5 | 114.2 | 117.9 | 121.8 | 117.97 | 3.80 | −41.4397 |
| 5 | 178 | 30 | 2 | 117 | 120.9 | 123.6 | 120.5 | 3.32 | −41.623 |
| 6 | 178 | 35 | 1 | 120.2 | 124.6 | 126.3 | 123.7 | 3.15 | −41.8502 |
| 7 | 235 | 25 | 2 | 142 | 146 | 150.5 | 146.17 | 4.25 | −43.3006 |
| 8 | 235 | 30 | 1 | 145.4 | 152.4 | 154 | 150.6 | 4.57 | −43.5605 |
| 9 | 235 | 35 | 1.5 | 149.2 | 154.9 | 157.9 | 154 | 4.42 | −43.754 |

FIG. 5

| Signal-to-Noise ratio of each level | A. Probe Aperture PA (nm) | B. Exposure Energy/μm ee (nJ/μm) | C. Developing Time DT (sec) |
|---|---|---|---|
| Level 1 | −40.0987 | −41.4162 | −41.6397 |
| Level 2 | −41.6376 | −41.8111 | −41.8145 |
| Level 3 | −43.5384 | −42.0473 | −41.8205 |

| Factors | SS | DOF | MS | F ratio | P% |
|---|---|---|---|---|---|
| A | 17.81279 | 2 | 8.906395 | 225.5088 | 95.95% |
| B | 0.610064 | 2 | 0.305032 | 7.72337 | 3.29% |
| C | 0.063295 | 2 | 0.031648 | 0.801316 | 0.34% |
| Error | 0.078989 | 2 | 0.039495 | | 0.42% |
| Total | 18.56514 | 8 | | | 100% |

FIG. 8

| Run | A. Probe Aperture PA input layer set value | B. Exposure Energy nJ/$\mu$m (ee input layer set value) | C. Developing Time DT input layer set value | First stage output layer set value | Remarks (FWHM) |
|---|---|---|---|---|---|
| 1 | 0.44 | 0.5 | 0.4 | 0.461167 | |
| 2 | 0.44 | 0.65 | 0.6 | 0.415555 | |
| 3 | 0.44 | 0.8 | 0.8 | 0.397833 | |
| 4 | 0.579355 | 0.5 | 0.6 | 0.34236 | |
| 6 | 0.579355 | 0.8 | 0.4 | 0.317109 | |
| 7 | 0.8 | 0.5 | 0.8 | 0.22789 | |
| 8 | 0.8 | 0.65 | 0.4 | 0.211903 | |
| 9 | 0.8 | 0.8 | 0.6 | 0.2 | |
| Prediction 5 | 0.579355 | 0.65 | 0.8 | 0.318 ~0.326 | Prediction FWHM= 123.5~121.6 |
| Run 5 | 0.579355 | 0.65 | 0.8 | 0.331085 | Experimental value FWHM=120.5 |

FIG. 9

| Run | A. Probe Aperture PA input layer set value | B. Exposure Energy nJ/μm (ee input layer set value) | C. Developing Time DT input layer set value | 2-1 stage output layer set value | Remarks |
|---|---|---|---|---|---|
| 1 | 0.44 | 0.5 | 0.4 | 0.461167 | Experimental value |
| 1a | 0.44 | 0.5 | 0.6 | 0.4504142 | Predicted value of addition model |
| 1b | 0.44 | 0.5 | 0.8 | 0.4500451 | Predicted value of addition model |
| 2 | 0.44 | 0.65 | 0.6 | 0.415555 | Experimental value |
| 2a | 0.44 | 0.65 | 0.4 | 0.4263072 | Predicted value of addition model |
| 2b | 0.44 | 0.65 | 0.8 | 0.4151856 | Predicted value of addition model |
| 3 | 0.44 | 0.8 | 0.8 | 0.397833 | Experimental value |
| 3a | 0.44 | 0.8 | 0.4 | 0.4089543 | Predicted value of addition model |
| 3b | 0.44 | 0.8 | 0.6 | 0.6294545 | Predicted value of addition model |
| 4 | 0.579355 | 0.5 | 0.6 | 0.34236 | Experimental value |
| 4a | 0.579355 | 0.5 | 0.4 | 0.3531126 | Predicted value of addition model |
| 4b | 0.579355 | 0.5 | 0.8 | 0.341991 | Predicted value of addition model |
| 6 | 0.579355 | 0.8 | 0.4 | 0.317109 | Experimental value |
| 6a | 0.579355 | 0.8 | 0.6 | 0.3063564 | Predicted value of addition model |
| 6b | 0.579355 | 0.8 | 0.8 | 0.3059873 | Predicted value of addition model |
| 7 | 0.8 | 0.5 | 0.8 | 0.22789 | Experimental value |
| 7a | 0.8 | 0.5 | 0.4 | 0.2390117 | Predicted value of addition model |
| 7b | 0.8 | 0.5 | 0.6 | 0.2282592 | Predicted value of addition model |
| 8 | 0.8 | 0.65 | 0.4 | 0.211903 | Experimental value |
| 8a | 0.8 | 0.65 | 0.6 | 0.2011503 | Predicted value of addition model |
| 8b | 0.8 | 0.65 | 0.8 | 0.2514956 | Predicted value of addition model |
| 9 | 0.8 | 0.8 | 0.6 | 0.2 | Experimental value |
| 9a | 0.8 | 0.8 | 0.4 | 0.2107525 | Predicted value of addition model |
| 9b | 0.8 | 0.8 | 0.8 | 0.1996309 | Predicted value of addition model |
| Prediction 5 | 0.432258 | 0.5 | 0.8 | 0.322 ~0.326 | Predicted FWHM= 122.5~121.6 |
| Run 5 | 0.432258 | 0.5 | 0.8 | 0.3310847 | Experimental FWHM=120.5 |

FIG. 10

| Run | A. Probe Aperture PA input layer set value | B. Exposure Energy nJ/μm (ee input layer set value) | C. Developing Time DT input layer set value | 2-1 stage output layer set value | Remarks |
|---|---|---|---|---|---|
| 1 | 0.44 | 0.5 | 0.4 | 0.461167 | Experimental value |
| 1 | 0.44 | 0.5 | 0.4 | 0.461167 | Experimental value |
| 1a | 0.44 | 0.5 | 0.6 | 0.4504142 | Predicted value of addition model |
| 1b | 0.44 | 0.5 | 0.8 | 0.4500451 | Predicted value of addition model |
| 2 | 0.44 | 0.65 | 0.6 | 0.415555 | |
| 2 | 0.44 | 0.65 | 0.6 | 0.415555 | |
| 2a | 0.44 | 0.65 | 0.4 | 0.4263072 | |
| 2b | 0.44 | 0.65 | 0.8 | 0.4151856 | |
| 3 | 0.44 | 0.8 | 0.8 | 0.397833 | |
| 3 | 0.44 | 0.8 | 0.8 | 0.397833 | |
| 3a | 0.44 | 0.8 | 0.4 | 0.4089543 | |
| 3b | 0.44 | 0.8 | 0.6 | 0.6294545 | |
| 4 | 0.579355 | 0.5 | 0.6 | 0.34236 | |
| 4 | 0.579355 | 0.5 | 0.6 | 0.34236 | |
| 4a | 0.579355 | 0.5 | 0.4 | 0.3531126 | |
| 4b | 0.579355 | 0.5 | 0.8 | 0.341991 | |
| 6 | 0.579355 | 0.8 | 0.4 | 0.317109 | |
| 6 | 0.579355 | 0.8 | 0.4 | 0.317109 | |
| 6a | 0.579355 | 0.8 | 0.6 | 0.3063564 | |
| 6b | 0.579355 | 0.8 | 0.8 | 0.3059873 | |
| 7 | 0.8 | 0.5 | 0.8 | 0.22789 | |
| 7 | 0.8 | 0.5 | 0.8 | 0.22789 | |
| 7a | 0.8 | 0.5 | 0.4 | 0.2390117 | |
| 7b | 0.8 | 0.5 | 0.6 | 0.2282592 | |
| 8 | 0.8 | 0.65 | 0.4 | 0.211903 | |
| 8 | 0.8 | 0.65 | 0.4 | 0.211903 | |
| 8a | 0.8 | 0.65 | 0.6 | 0.2011503 | |
| 8b | 0.8 | 0.65 | 0.8 | 0.2514956 | |
| 9 | 0.8 | 0.8 | 0.6 | 0.2 | |
| 9 | 0.8 | 0.8 | 0.6 | 0.2 | |
| 9a | 0.8 | 0.8 | 0.4 | 0.2107525 | |
| 9b | 0.8 | 0.8 | 0.8 | 0.1996309 | |
| Prediction 5 | 0.579355 | 0.65 | 0.8 | 0.327 ~0.331 | Predicted FWHM= 121.4~120.5 |
| Run 5 | 0.579355 | 0.65 | 0.8 | 0.3310847 | Experimental FWHM=120.5 |

FIG. 11

| Run | A. Probe Aperture PA (nm) | Energy/μm ee (nJ/μm) | C. Developing Time DT (sec) | Mean FWHM | S (Standard Deviation) | S/N (dB) | Remarks |
|---|---|---|---|---|---|---|---|
| Addition 1 | 140.9 | 14.3 | 2 | 89.1 | 4.1 | −39.0067 | Important factors |
| Addition 2 | 158 | 25 | 1.5 | 107.2 | 4.1 | −40.6102 | Important factors |
| Addition 3 | 198 | 25 | 1.5 | 127.6 | 4.1 | −42.1215 | Important factors |

FIG. 12

| Run | A. Probe Aperture PA input layer set value | B. Exposure Energy nJ/μm (ee input layer set value) | C. Developing Time DT input layer set value | Third stage output layer set value | Remarks |
|---|---|---|---|---|---|
| The 32 groups of training examples obtained by fine training the 2-2 stage neural network ||||||
| Addition 1 | 0.435742 | 0.179 | 0.8 | 0.492019 | Important factors |
| Addition 1 | 0.435742 | 0.179 | 0.8 | 0.492019 | Important factors |
| Addition 2 | 0.501935 | 0.5 | 0.6 | 0.393383 | Important factors |
| Addition 2 | 0.501935 | 0.5 | 0.6 | 0.393383 | Important factors |
| Addition 3 | 0.656774 | 0.5 | 0.6 | 0.300421 | Important factors |
| Addition 3 | 0.656774 | 0.5 | 0.6 | 0.300421 | Important factors |
| Prediction 5 | 0.579355 | 0.65 | 0.8 | 0.330 ~0.334 | Predicted FWHM= 120.8~120.9 |
| Run 5 | 0.579355 | 0.65 | 0.8 | 0.3310847 | Experimental FWHM=120.5 |

FIG. 13

| Prediction Verification Experiment Run | Network Input Module | | | First stage FWHM predicted value | FWHM predicted value of stage-wise Taguchi neural network model | FWHM value of verification experiment | Remarks |
|---|---|---|---|---|---|---|---|
| | A. Probe Aperture PA (nm) | B. Exposure Energy/μm ee (nJ/μm) | C. Developing Time DT (sec) | | | | |
| 1 | 127.8 | 13.8 | 1.5 | 80.5 | 82.7 | 81.7 | Aperture obtained by back calculation |
| | 0.385 | 0.164 | 0.6 | 0.546 | 0.532 | 0.538 | |
| 2 | 142 | 18 | 1.5 | 88.3 | 91.3 | 90.6 | Aperture obtained by back calculation |
| | 0.44 | 0.29 | 0.6 | 0.497 | 0.479 | 0.483 | |
| 3 | 162 | 25 | 1.5 | 106.9 | 107.9 | 108.0 | Aperture obtained by back calculation |
| | 0.517 | 0.5 | 0.6 | 0.395 | 0.390 | 0.389 | |
| 4 | 206 | 28 | 2 | 137.1 | 135.9 | 135.1 | Aperture obtained by back calculation |
| | 0.688 | 0.59 | 0.8 | 0.262 | 0.267 | 0.270 | |

FIG. 14

PREDICTION METHOD OF NEAR FIELD PHOTOLITHOGRAPHY LINE FABRICATION USING BY THE COMBINATION OF TAGUCHI METHOD AND NEURAL NETWORK

CROSS-REFERENCE TO RELATED APPLICATION

This application claims the priority benefit of Taiwan application serial no. 96107810, filed Mar. 7, 2007. All disclosure of the Taiwan application is incorporated herein by reference.

BACKGROUND OF THE INVENTION

1. Field of the Invention

The present invention generally relates to a prediction method of photolithography line fabrication, in particular, to a prediction method of near field photolithography line fabrication by using the combination of Taguchi method and neural network to build a Taguchi neural network that requires fewer experimental frequency, shorter prediction time and higher prediction accuracy.

2. Description of Related Art

The core technique and process parameters of near field photolithography line fabrication are very complicated and its experiment consumes considerable time and cost. Furthermore, the theoretical model of near field photolithography line fabrication is also very complicated. Therefore, the conventional technique often makes use of the parameter design method developed by Professor Genichi Taguchi to find the optimal conditions for setting the parameters and perform analysis with the disposition of orthogonal arrays, smaller the better (STB), larger the better (LTB) and signal-to-noise (SN) ratio. However, the experimental frequency is high and the simulation time is long. Hence, the method has few industrial applications.

SUMMARY OF THE INVENTION

Accordingly, the present invention is directed to a prediction method of near field photolithography line fabrication by using the combination of Taguchi method and neural network to build a Taguchi neural network that requires fewer experimental frequency, shorter prediction time and higher prediction accuracy.

The present invention is directed to a Taguchi neural network of a prediction method of near field photolithography line fabrication. The Taguchi neural network of the prediction method can provide more accurate prediction result compared to the network of the conventional Taguchi method of using experimental data to serve as training examples, and can improve the demerit of requiring massive training examples of the conventional neural network.

The present invention is also directed to a prediction method of near field photolithography line fabrication that uses the combination of Taguchi method and neural network. The prediction method has significant reference value in line fabrication.

According to an embodiment of the present invention, a prediction method of near field photolithography line fabrication that uses the combination of Taguchi method and neural network is provided. The prediction method includes the following steps.

The first step is combining the theoretical model and the experiment of the near field photolithography line fabrication and using a non-destruction method to back calculate the fiber probe aperture size. The error between the experimentally measured result and the simulated result of the theoretical model of near field photolithography is set as an objective function. By using the objective function, an optimizing search and a reasonable convergence rule, a fiber probe aperture size that matches the experimental and theoretical model is back calculated.

The second step is using the orthogonal array of the Taguchi method to perform a near field photolithography line fabrication experiment. For example, the L9 orthogonal array is used to perform the near field photolithography line fabrication experiment so as to reduce experimental frequency.

The third step is performing a data analysis of the Taguchi method that includes producing a response table, a response chart and an analysis of variance (ANOVA) table.

The fourth step is using the experimental data of the orthogonal array as training examples of a first stage network (ANN) to build a preliminary network, which also serves as a reference for improving the result of a second stage network and a third stage network.

The fifth step is performing a second stage fine training of the network. The light factors of Taguchi analysis are used as the training examples for the expansion of the second stage network and performs the second stage fine training. Furthermore, to emphasize the importance of the information of the experimental data over the light factor data, the frequency of the training examples of the experimental data is increased.

The sixth step is determining third stage critical experimental training examples to be added according to the 'important factors', 'uncertain factors' and 'preferred combination of factors according to ANN inferred Taguchi parameters'.

The seventh step is completing the third stage high prediction accuracy neural network.

Accordingly, the present invention provides a method of building a set of experimental prediction model that requires fewer experimental frequency, shorter prediction time and higher prediction accuracy by using the advantages of combining the experimental data of Taguchi method and neural network learning.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a control factor level table of a Taguchi method of analysis of a near field photolithography line fabrication experiment.

FIG. 4 is a floating parameter table of using exposure speed to control exposure energy/μm.

FIG. 5 is a table showing the Taguchi method of analysis of a near field photolithography line fabrication experiment.

FIG. 8 is an analysis of variance table of the Taguchi method of analysis.

FIG. 9 is a table listing the first stage training examples of a neural network.

FIG. 10 is a table listing the light factors used as the expansion training examples of the neural network.

FIG. 11 is a table listing the training examples for fine training the 2-2 stage neural network.

FIG. 12 is a table listing the critical experiments to be added to the third stage.

FIG. 13 is a table listing the training example data of the third stage network.

FIG. 14 is a table for comparing the prediction results between a first stage network and the 'stage-wise Taguchi neural network model'.

DESCRIPTION OF THE EMBODIMENTS

Figure 1A:
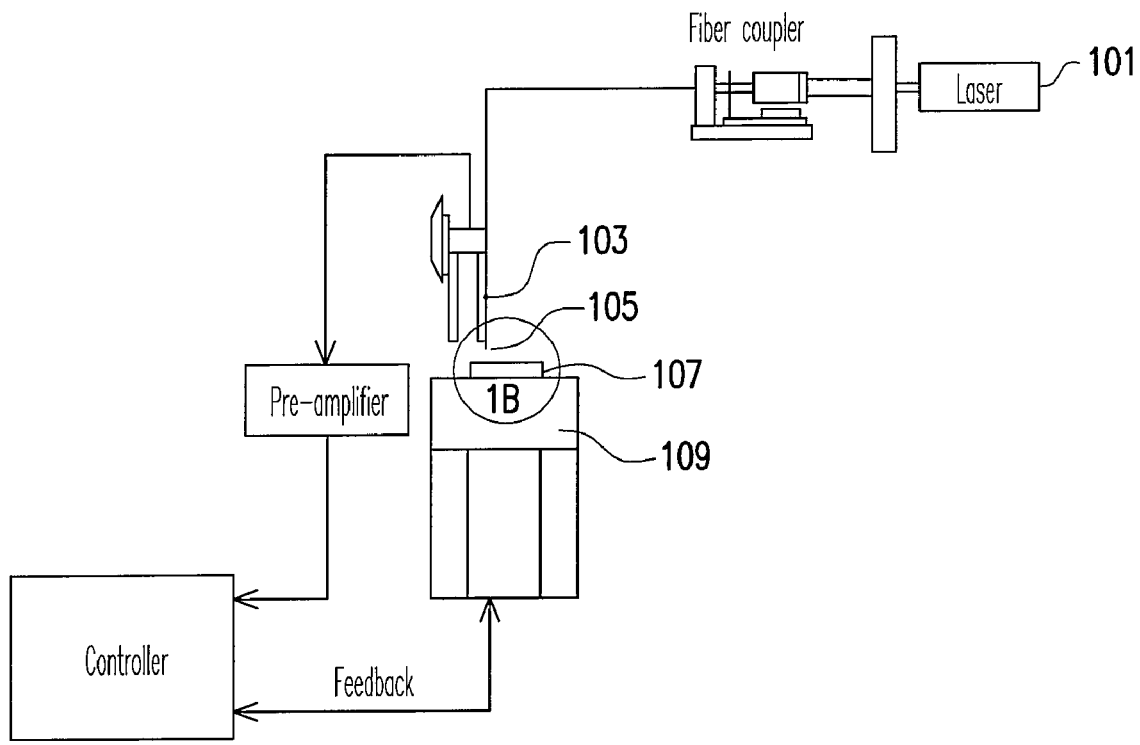
FIG. 1A is a schematic diagram showing the set up of a near field photolithographic line fabrication experiment.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
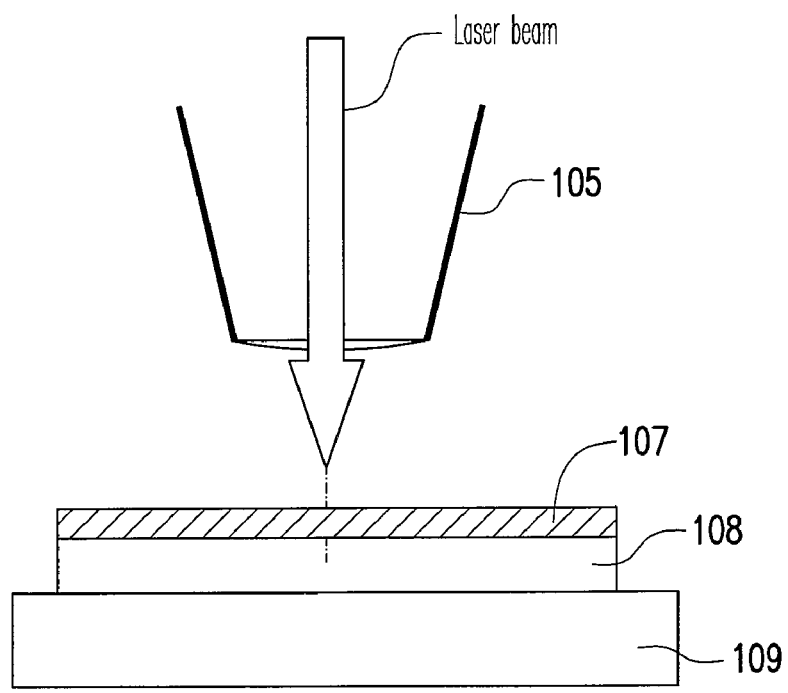
FIG. 1B is a diagram showing the set up of a fiber probe and photoresist.

FIG. 1A is a schematic diagram showing the set up of a near field photolithographic line fabrication experiment. As shown in FIG. 1A, the fiber probe 105 is adhered to one side of the tuning fork 103 and the other side of the tuning fork 103 is attached to the z-axis of the machine. The near field distance between the fiber probe 105 and the test piece 107 is controlled by the shear stress tuning fork model. Because the tuning fork 103 is non-symmetrical, a difference in voltage between the two electrodes is produced when one side of the tuning fork 103 is excited. When the fiber probe 105 approaches the test piece (for example, the photoresist 107) to a near field distance, the fiber probe 105 will sense the atomic force and changes its amplitude. Therefore, the voltage of the tuning fork 103 will change. The tuning fork 103 feedbacks an output voltage to control the height of the z-axis. Therefore, a fixed near field distance between the fiber probe 105 and the photoresist can be maintained by controlling the output voltage at a fixed value. To provide a clearer display of the diagram, the circle 1B within the FIG. 1A is magnified and displayed in FIG. 1B. FIG. 1B is a diagram showing the set up of a fiber probe and photoresist. The photoresist 107 is directly spin-coated on the substrate 108. After performing a soft baking operation, the photoresist 107 is disposed on the platform of a near field optical microscope 109. An argon (Ar) ion laser beam 101 passes through a fiber coupler and is transmitted to the sharp end of the fiber probe 105. Next, the photoresist 107 is exposed at a near field distance. After performing the exposure, the photoresist is developed, hard-baked and measured using an atomic force microscope (AFM). The near field photolithography line fabrication experiment of the present embodiment uses an argon ion laser beam having an optical wavelength 488 nm as the laser beam, the SPR3001 photoresist manufactured by Shipley Co. as the photoresist 107 and the CD-26 developer as the developer in the developing process, for example.

The foregoing embodiment is used in the present invention to provide a prediction method of near field photolithography line fabrication by using the combination of Taguchi method and neural network. As shown in the flow chart of FIG. 2, the present invention includes the following steps. First, a non-destructive method is used to back calculate the fiber probe aperture size. Next, the theoretical model and the experiment of near field photolithography line fabrication are combined. The error between the experimentally measured result and the simulated result of the theoretical model of near field photolithography is set as an objective function. By using the objective function, an optimizing search and a reasonable convergence rule, a fiber probe aperture size that matches the experimental and theoretical model is back calculated. After that, the Taguchi method is used to perform near field photolithography line fabrication experiment: for example, a near field photolithography line fabrication experiment is performed according to the L9 orthogonal array. After the experiment, the experimental result in the L9 orthogonal array is analyzed to produce processed experimental data, which are used to set up a response table, a response chart and ANOVA.

In the process of building the prediction method of near field photolithography line fabrication, the experimental data of the orthogonal array are used as training examples of a first stage network (ANN) to build a preliminary network, which also serves as a reference for improving the result of a second stage network and a third stage network. The light factors of Taguchi analysis are used as the training examples for the expansion of the second stage network to perform the second stage fine training. Furthermore, to emphasize the importance of the information of the experimental data over the light factor data, the present invention increases the frequency of the training examples of the experimental data. Finally, the critical experimental training examples of the third stage to be added are determined according to the 'important factors', 'uncertain factors' and 'preferred combination of factors according to ANN inferred Taguchi parameters', and the back added experiments and network training are executed.

The prediction model of near field photolithography line fabrication of the present invention builds a stage-wise Taguchi neural network model for analyzing and predicting near field photolithography line fabrication by combining the advantages of the orthogonality of the orthogonal array experiment of the Taguchi method and the learning capability of neural network.

Figure 2:
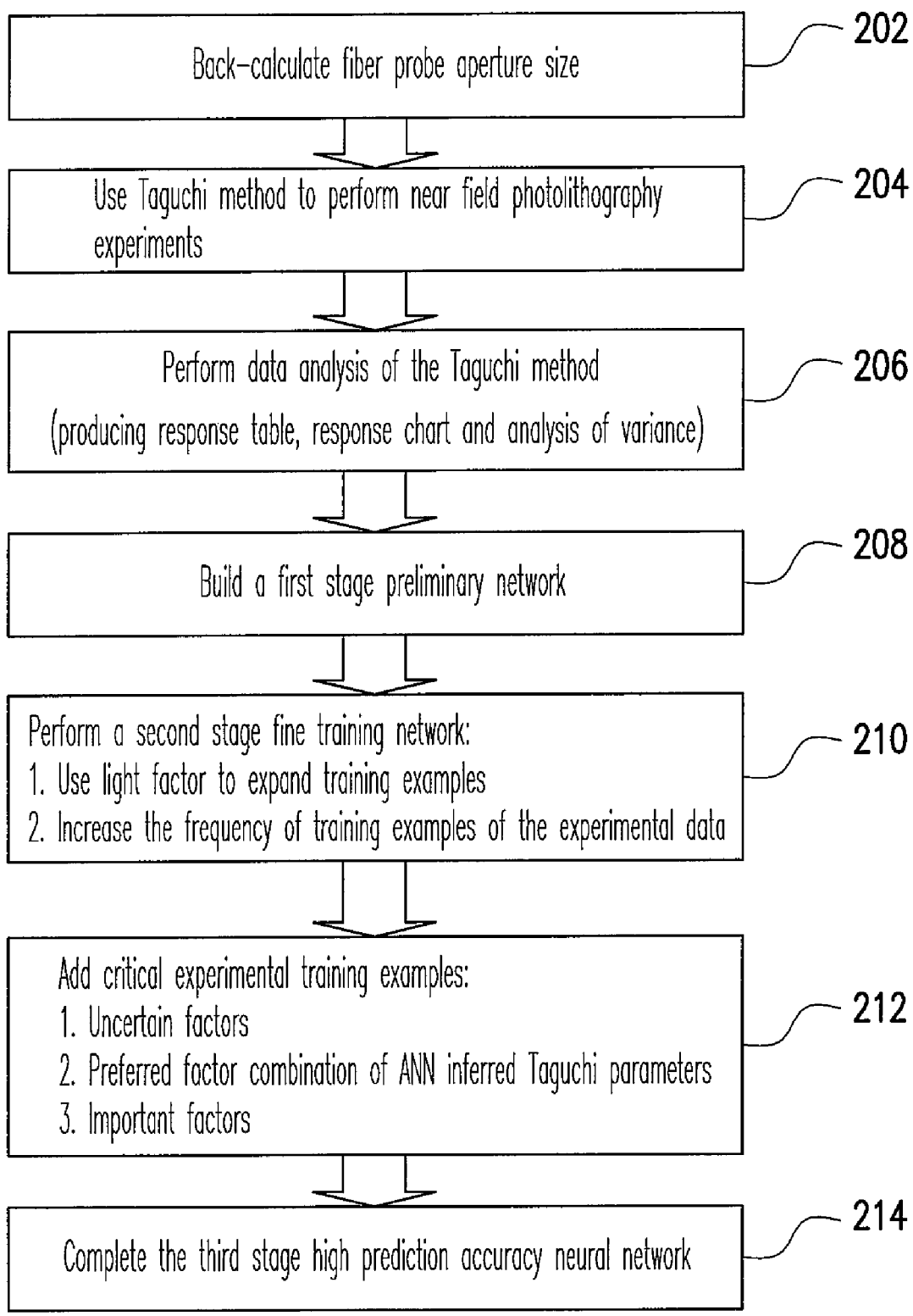
FIG. 2 is a flow chart showing the steps of building up a near field photolithography line fabrication prediction model by using a combination of Taguchi method and neural network.

First, in step 202 of FIG. 2, the fiber probe aperture size is back calculated. The fiber probe aperture size is back calculated by combining the theoretical model and the experiment of near field photolithography line fabrication and using a non-destruction method. The error between the experimentally measured result and the simulated result of the theoretical model of near field photolithography is set up as an objective function. By using the objective function, an optimizing search and a reasonable convergence rule, a fiber probe aperture size that matches the experimental and theoretical model is back calculated.

In step 204 of FIG. 2, a near field photolithography line fabrication experiment is performed, for example, using the orthogonal array L9 of the Taguchi method. The processing parameters are: A. probe aperture (PA), B. exposure energy/μm (ee), and C. developing time (DT). These three parameters are the control factors of near field photolithography line fabrication. Furthermore, each control factor has three levels. The control factors and levels are shown in FIG. 3.

In photolithography line fabrication experiment, the exposure energy/μm=exposure power/exposure speed. Therefore, by maintaining the exposure power at a fixed value, the exposure speed can be used to control the level of exposure energy/μm. FIG. 4 is a floating parameter table of using exposure speed to control exposure energy/μm.

In step 206 of FIG. 2, a data analysis of the Taguchi method is performed. After performing the near field photolithography line fabrication experiment according to the L9 orthogonal array of FIG. 5, a data analysis of the Taguchi method is performed. The formula for calculating the standard deviation S is:

$$S = \sqrt{\frac{\sum_{i=1}^{n}(y_i - \bar{y})^2}{n-1}}$$

wherein:

n: the number of fabrication lines in each group, n=3 in the present invention, $\bar{y}$: the mean of half height line width of each group of experiments, $y_i$: the half height line width of the $i^{th}$ fabrication line.

At the same time, the signal-to-noise (S/N) ratio can be obtained from the formula for smaller the better, the calculating formula is:

$$S/N = -10 \log(\bar{y}^2 + S^2)$$

Figures 6, 7:
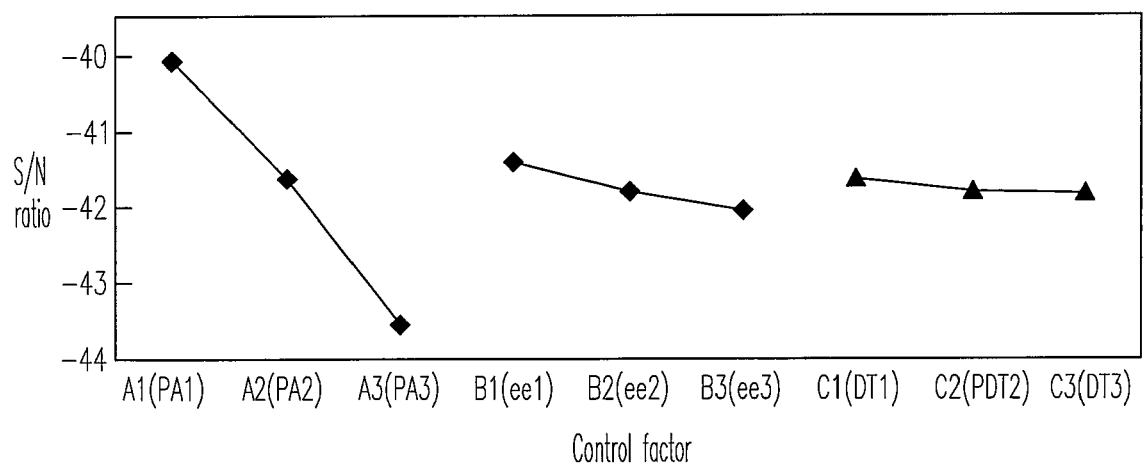
FIG. 6 is a control factor S/N response table of the Taguchi method of analysis.
FIG. 7 is a control factor S/N response chart of the Taguchi method of analysis.

In the step 206 of FIG. 2, the method of calculating the response table of the Taguchi method of analysis uses the S/N ratio as a basis of the calculation. The levels of the S/N ratio of each control parameter are added according to the location it appears in FIG. 5 to obtain a total and then the total is divided by the frequency of appearances to obtain the S/N ratio at each level. After some arrangement, the response table as shown in FIG. 6 is produced. Furthermore, the response table can be converted into a chart form as shown in FIG. 7.

In the step 206 of FIG. 2, the main objective of the ANOVA in the Taguchi method of analysis is to estimate the experimental error. Through the ANOVA, the degree of contribution of each control parameter on the simulated experiment can be understood. To perform the ANOVA, the total sum of squares needs to be calculated:

$$GTSS = \sum_{i=1}^{n}(S/N)_i^2$$

and the total sum of squares (GTSS) can be divided into two main parts:

(1) Sum of squares due to the total mean of the experiment:

$$SS_{due\ to\ mean} = n_{exp} \times \overline{S/N}^2$$

wherein, $n_{exp}$ is the number of experiments in the orthogonal array, and $\overline{S/N}$ is the mean S/N ratio of the experiment.

(2) Sum of squares of the variation from the mean:

$$SS_{Total} = \sum_{i=1}^{n}(S/N_i - \overline{S/N})^2$$

Therefore, GTSS=$SS_{Total}$+$SS_{due\ to\ mean}$

The sum of squares of each control factor ($SS_{Factor}$) can be calculated using the level of the mean S/N ratio of each factor and the mean S/N ratio of all experimental groups. For example, factor A has three levels A1, A2 and A3, then the sum of squares of the A factor is:

$$SS_A = n_{A1} \cdot (\overline{S/N}_{A1} - \overline{S/N})^2 + n_{A2} \cdot (\overline{S/N}_{A2} - \overline{S/N})^2 + n_{A3} \cdot (\overline{S/N}_{A3} - \overline{S/N})^2$$

wherein, $n_{A1}$ is the number of experiments with the A factor being A1 in the orthogonal array experiment, and $\overline{S/N}_{A1}$ is the mean S/N ratio of these experiments.

According to $SS_{Factor}$ and $SS_{Total}$, the percentage contribution of each factor can be determined:

$$P_{Factor} = (SS_{Factor}/SS_{Total}) \times 100\%$$

The degrees of freedom of each control factor is calculated. The degree of freedom of each factor is equal to its levels minus 1. The total number of degrees of freedom is equal to the total number of measured values minus 1. The degree of freedom error is the total degrees of freedom minus the sum of the degree of freedom of each factor.

$$DOF_{Total} = n_{exp} - 1$$

The mean of sum of squares of the factors is defined as the ratio of the sum of squares of the factors and the degree of freedom of the factors:

$$MS = \frac{sum\ of\ squares\ of\ factors}{degree\ of\ freedom\ of\ factors}$$

The error mean square of the experimental error factors is defined as:

$$S_e^2 = \frac{sum\ of\ square\ of\ errors}{degree\ of\ freedom\ of\ error\ factors}$$

Therefore, the importance of each control factor can be estimated by quantizing the variance ratio, the F-ratio is defined as the ratio between the mean of sum of squares of the control factors and the error mean square of the experimental error factors.

$$F = \frac{MS}{S_e^2} = \frac{mean\ of\ sum\ of\ squares\ of\ control\ factors}{error\ mean\ square\ of\ error\ factors}$$

The larger the value of F, the lower the correlation between the two is. Hence, the F value can be used to estimate the effect of each factor relative to the 'importance' of the experimental error. The factor is used in a subsequent S/R ratio prediction only when the 'importance' reaches a definite level. These factors are called 'important factors'. Conversely, the effects of other factors can only be regarded as 'infrequent effects' caused by experimental errors and are called 'light factors'. After completing the analysis of variance, the effect of each parameter in the orthogonal array experiment can be understood from the degrees of contribution of the control factors. Through the degrees of contribution by the error factors, the effectiveness of the experiment can be estimated.

After the foregoing ANOVA, the effect of the probe aperture (PA) on the near field photolithography line fabrication experiment is the most significant. The degree of contribution of the PA is 95.95% as shown in FIG. 8. This is followed by the exposure energy/μm and the effect of developing time (DT) is the least significant.

In the step 208 of FIG. 2, a first stage or preliminary network is build. The building process is as follows. Step one: the present invention uses a back-propagation neural network as a system network. The back-propagation neural network has a three-layer structure: an input layer, a hidden layer and an output layer. The neural element of the single-layered hidden layer is:

$$n_H = \frac{n_{WG}}{n_I + n_O}$$

wherein, $n_H$ is the number of neural elements in the hidden layer, $n_I$ is the number of neural elements in the input layer, $n_O$ is the number of neural elements in the output layer, $n_{WG}$ is the number of neural keys; and the number of neural elements of a network having multiple hidden layers is:

$$n_H = \frac{-(n_O + n_H) + \sqrt{(n_O + n_H)^2 + 4(r-1) \times n_{WG}}}{2(r-1)}$$

wherein, r is the number of hidden layers.

Next, step two: after performing a normalization procedure on each combination of the control factors in the Taguchi orthogonal array experiment, the control factors are converted into an input module of training examples of the neural network. After performing a normalization procedure on the S/N ratios of the orthogonal array experiment, the S/N ratios are converted into an output module of training examples of the network. In the aforementioned L9 orthogonal array, the input module of network training examples includes probe aperture, exposure energy/μm and developing time, and the output module includes the S/N ratios of the orthogonal array.

Step three: normalizing the input module and the output module, the formula is:

$$D_{nor} = D_{min} + \frac{V_{orig} - V_{min}}{V_{max} - V_{min}}(D_{max} - D_{min})$$

wherein, $D_{nor}$ is the value after the normalization of the input module and the output module, $V_{orig}$ is the original value before the normalization of the input module and the output module, $V_{min}$ is the smallest value before the normalization of the input module and the output module, $V_{max}$ is the largest value before the normalization of the input module and the output module, $D_{min}$ is the smallest value after the normalization of the input module and the output module, and $D_{max}$ is the largest value after the normalization of the input module and the output module.

Step four: a network training is performed. According to the difference between the expected output value of the network and the actual output value of the network training examples, the weight between the neural element of the output layer and the neural element of an adjacent layer is adjusted. This kind of adjustment is performed layer by layer until all the related weights are renewed.

After completing the training operation, inference of the half height line width (the S/N value) can be performed. At the same time, an inverse normalization procedure is performed on the output value obtained after network inference to reflect the true value.

Step five: the network predicts the output module. After the network training, the module parameters to be predicted, which include the probe aperture, the exposure energy/μm and the developing time, are input to obtain the normalized values of the predicted S/N ratios. After performing the inverse normalization procedure on the normalized values of the predicted S/N ratios using the formula below, the true values of the S/N ratios are obtained.

$$V_{pre} = V_{min} + \frac{(V_{nor} - D_{min}) \cdot (V_{max} - V_{min})}{D_{max} - D_{min}}$$

wherein, $V_{pre}$ is the true value of the predicted S/N ratio, and $V_{nor}$ is the normalized value of the predicted S/N ratio.

In the step 210 of FIG. 2, a second stage fine training of the network is performed. According to the ANOVA in the step 206, the effect of each factor relative to the 'importance' of the error of the experiment can be estimated. The present invention is based on the assumption of ignoring the effects of the 'light factors' to schedule the training examples for the fine training of the second stage network. The S/N ratios of the parameter combination of non-experimented light factors (A B C2) can be calculated by using the S/N ratios of the parameter combination (A B C1) of the already experimented and the known S/N ratios of C1 and C2 through the Taguchi analysis, the formula is:

$$S/N(A\ B\ C2) = S/N(A\ B\ C1) + C2 - C1$$

wherein, C1 and C2 are the S/N ratios after performing the Taguchi experimental analysis.

Using the 8 groups of training examples of the preliminary network in the first stage as an example, if one control factor (developing time) from each group of experimental examples is a 'light factor', the aforementioned addition model of the Taguchi method can calculate out two groups of S/N ratios. Hence, the 8 groups of training examples of the preliminary network in the first stage can produce 24 groups of training examples for fine training the 2-1 stage by using the addition model of the 'light factor' to calculate. At the same time, to emphasize the importance of the information of the experimental data over the light factor data, the frequency of the training examples of the experimental data is increased. Therefore, through the 24 groups of expansion training examples and the training examples with increased experimental data obtained by addition model estimation of the 'light factors', the 32 groups of training examples for fine training the 2-2 stage network are obtained.

In the step 212 of FIG. 2, the critical experimental training examples of the third stage to be added is determined according to the 'important factors', 'uncertain factors' and 'preferred combination of factors according to ANN inferred Taguchi parameters', the steps for making the decisions are as follows.

Step one: the 'important factors' and the 'light factors' are identified according to the result of the ANOVA, and the variance ratios and the percentages of the degree of contribution (P %) of each factor are calculated. If the F value is greater than a set confidence level of a variance ratio, the factor is regarded as 'an important factor', otherwise, it is a 'light factor'.

Step two: the Taguchi addition model is used to calculate the predicted S/N value of factor combination. According to the S/N ratio data of the orthogonal array experiment and using the linear addition module, the S/N ratios of other non-experimented factor combination are predicted.

Step three: the second stage expansion training examples are scheduled according to the 'light factors'. The 'light factors' are those factors with factor level variations having little effect on the analytical characteristics. Therefore, according to the assumption of ignoring the effects of 'light factors' in the present invention, the 'light factors' are used to schedule the second stage network expansion training examples. Using a L9 orthogonal array with 3 three level factors as an example, if one of the factors is taken as a 'light factor', then the training examples are combined according to the factors of the L9 experiment. If Run 5 experiment of the orthogonal array is not listed as a training example of the network but rather serves as an experimental example of verification, the training examples can be increased to 32 groups of network training modules.

Step four: the second stage network training is performed. The network training examples obtained in the third step are converted to normalized input module of network training and the second stage network training is executed.

Step five: the 'uncertain factor combination' is determined. To test the consistent prediction of network inference and Taguchi addition model, all the Taguchi factor combinations are input to the second stage network to perform an all factor test. If the difference between the predicted value of network inference and the predicted value of Taguchi addition model is greater than the experimental error range (for example, 10%), the presence of controversy is implied and these groups of factors are judged to be 'uncertain factor combinations'. The purpose of adding 'uncertain factor combination' experiment is to remove the confusing experimental information and secure the correct experimental information.

Step six: the network output value is analyzed to obtain 'preferred combination of factors according to ANN inferred Taguchi parameters'. After completing the all factor test of the parameters of the Taguchi method in the fifth step, the network can infer the preferred factor combination of the factor level points, the so-called 'preferred combination of factors according to ANN inferred Taguchi parameters'. Because the factor level points of the Taguchi method are partition parameters, the output values of the 'preferred combination of factors according to ANN inferred Taguchi parameters' are the preferred output values of the 27 groups of parameter combinations in the all factor test of the Taguchi method. The purpose of adding the 'preferred combination of factors according to ANN inferred Taguchi parameters' experiments is to ensure the experiments of the Taguchi orthogonal array has already acquired the preferred conditions and has really improved the quality.

Step seven: the network training examples of 'important factors' are enhanced. The 'important factors' are those factors with factor level variations having significant effect on the analytical characteristics. To prevent the network prediction module differing too much from the training example module and leading to unavoidable increase in error, one to two groups of experiments are inserted between two levels of the 'important factor' according to step one to enhance the training examples of the network.

In the step 214 of FIG. 2, the third stage neural network with high prediction accuracy is completed. Finally, the critical experimental training examples of the third stage to be added according to the 'important factors', 'uncertain factors' and 'preferred combination of factors according to ANN inferred Taguchi parameters' of step 112 are determined, and the added experiments and network training are executed.

FIG. 9 is a table listing the first stage training examples of a neural network according to an embodiment of the present invention. After the training examples in FIG. 9 has performed a normalization procedure on each combination of the control factors of the Taguchi L9 orthogonal array experiment shown in FIG. 5, the control factors are converted into an input module of training examples of the neural network. After performing the near field photolithography line fabrication experiments, the half height line width experimental values measured by the atomic force microscope (AFM) are applied to the smaller the better formula to calculate the S/N ratios. After performing a normalization procedure, the normalized S/N ratios are converted to training examples of an output module of the network. The aforementioned network training examples of the input module includes probe aperture, exposure energy/μm and developing time, and the output module is the S/N ratios of the orthogonal array. As shown in FIG. 9, after training with the 8 groups of experimental data of the L9 orthogonal array, the normalized predicted value of the fifth group of experiments of the predicted Taguchi L9 orthogonal array is 0.318~0.326. At the same time, the half height line width of the network predicted line fabrication can be calculated to be 123.5~121.6 nm by using the S/N ratio formula. Meanwhile, the half height line width of Run 5 experiment of near field photolithography line fabrication of the Taguchi L9 orthogonal array is 120.5 nm and its normalized value is 0.331085. Therefore, the largest error between the predicted value and the experimental value is about −4.0%. Furthermore, the large amplitude of vibration of the predicted value implies network accuracy can still be improved. Hence, a second stage fine training procedure of the network is reasonable.

FIG. 10 is a table listing the light factors used as second stage expansion training examples of the neural network according to an embodiment of the present invention. As shown in FIG. 10, after training with the 24 groups of data obtained through light factor expansion, the prediction value for predicting the fifth group of experiment is 0.322~0.326, and the network predicted half height line width of line fabrication obtained by S/N calculation is 122.5~121.6 nm. The half height line width of Run 5 experiment of near field photolithography line fabrication is 120.5 nm, and its normalized value is 0.331085. Therefore, the largest error between the predicted value and the experimental value is about −3.0%. Furthermore, the amplitude of vibration of the predicted value has been reduced, which indicates an improvement resulting from network learning.

FIG. 11 is a table listing the second stage repeatedly increased experimental data training examples of the neural network according to an embodiment of the present invention. In fact, FIG. 11 is the experimental data of the groups 1, 2, 3, 4, 6, 7, 8 and 9 in FIG. 10 repeatedly increased to serve as network training examples. As shown in FIG. 11, through the light factor expansion network training examples and the increasing of the training examples of the experimental data, the prediction value for predicting the fifth group of experiment is 0.327~0.331, and the network predicted half height line width of line fabrication obtained by S/N calculation is 121.4~120.5 nm. The half height line width of Run 5 experiment of near field photolithography line fabrication is 120.5 nm, and its normalized value is 0.331085. This indicates substantial improvement in the network accuracy and the fine training of the network is achieved.

FIG. 12 is a table listing the critical experiments to be added according to an embodiment of the present invention. The critical experimental training examples to be added are determined according to the 'important factors', 'uncertain factors' and 'preferred combination of factors according to ANN inferred Taguchi parameters', and the back added experiments and network training are executed.

FIG. 13 is a table listing the training example data of the third stage network of a neural network according to an embodiment of the present invention. As show in FIG. 13, through the third stage high prediction accuracy neural network, the prediction value for predicting the fifth group of experiment is 0.330~0.334, and the network predicted half height line width of line fabrication obtained by S/N calculation is 120.8~120.9 nm. The half height line width of Run 5 experiment of near field photolithography line fabrication is 120.5 nm, and its normalized value is 0.331085. This indicates the network accuracy has increased to 1%.

FIG. 14 is a table for comparing the prediction results between a first stage network and the 'stage-wise Taguchi neural network model' according to an embodiment of the present invention. In the present embodiment, the experimental parameters for predicting and verifying the near field photolithography line fabrication experiment Run 1 (data not attached) are probe aperture PA=127.8 nm, exposure energy/μm ee=13.8 nJ/μm and developing time DT=1.5 sec. Their experimental depth is 6.1 nm, the half height lie width is 81.7 nm. As shown in FIG. 14, the normalized value of the half height line width of the verifying experiment Run 1 is 0.537 and the half height line width is 81.7 nm. The normalized predicted value of the first stage network is 0.546, and the predicted half height line width of the near field photolithography line fabrication is 80.5 nm. The difference between the half height line width of the first stage network prediction and the near field photolithography line fabrication experiment is −1.5%. By using the formula according to the 'stage-wise Taguchi neural network model' of the present invention to calculate the predicted value, the network normalized predicted value is 0.532 and the predicted half height line width of the near field photolithography line fabrication is 82.7 nm. The error between the half height line width predicted by the stage-wise Taguchi neural network model and the near field photolithography line fabrication experiment is 1.2%. At the same time, according to Run 2, Run 3, and Run 4 of near field photolithography line fabrication experiments for prediction and verification as shown in FIG. 14 and trough the analytical result of the Taguchi neural network model, the experiments beyond a half height line width of 80 nm are proved. The Taguchi neural network model built according to the present invention can provide more accurate prediction than a first stage network of the conventional Taguchi method of using experimental data as training examples and improve the demerit of requiring massive training examples of the conventional neural network.

Regardless of whether the half height line width of the near field photolithography line fabrication is greater than 100 nm or smaller than 100 nm, both are within the applicable range of the present invention. At the same time, any experimental steps and flow similar to the ideas described in the foregoing preferred embodiments would be regarded as within the scope of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A prediction method of near field photolithography line fabrication by using the combination of Taguchi method and neural network, comprising:

a first step of combining a theoretical model and the experiment of a near field photolithography line fabrication, using a non-destruction method to back calculate the fiber probe aperture size, setting the error between an experimentally measured result and a simulated result of the theoretical model of near field photolithography as an objective function, and using the objective function, an optimizing search and a reasonable convergence rule to back calculate a fiber probe aperture size that matches the experimental and theoretical model;

a second step of using an orthogonal array of the Taguchi method to perform a near field photolithography line fabrication experiment, using a L9 orthogonal array to perform the near field photolithography line fabrication experiment so as to reduce experimental frequency;

a third step of performing a data analysis of the Taguchi method, and producing a response table, a response chart and an analysis of variance (ANOVA) table;

a fourth step of using the experimental data of the orthogonal array as training examples of a first stage network (ANN) to build a preliminary network, which also serves as a reference for improving the result of a second stage network and a third stage network;

a fifth step of performing a second stage fine training of the network using light factors of Taguchi analysis as the training examples for the expansion of the second stage network and performing the second stage fine training, and increasing the frequency of the training examples of the experimental data to emphasize the importance of the information of the experimental data over the light factor data;

a sixth step of determining third stage critical experimental training examples to be added according to the 'important factors', 'uncertain factors' and 'preferred combination of factors according to ANN inferred Taguchi parameters'; and a seventh step of completing the third stage high prediction accuracy neural network to build a set of experimental prediction model that requires fewer experimental frequency, shorter prediction time and higher prediction accuracy.

2. The prediction model according to claim 1, wherein, in the step of performing a data analysis of the Taguchi method, producing the response table and the response chart comprises:

step one: calculating a standard deviation s; and step two: calculating a signal-to-noise (S/N) ratio.

3. The prediction method according to claim 1, wherein, in the step of performing a data analysis of the Taguchi method, performing an analysis of variance (ANOVA) comprises:

step one: calculating a total sum of squares of the S/N ratios;

step two: calculating sum of squares due to the total mean of the S/N ratios;

step three: calculating sum of squares of the variation from the mean of the S/N ratios;

step four: calculating sum of squares of each control factor ($SS_{Factor}$) using the level of the mean S/N ratio of each factor and the mean S/N ratio of all experimental groups, when factor A has three levels A1, A2 and A34, then the sum of squares of the A factor is:

$$SS_A = n_{A1} \cdot (\overline{S/N}_{A1} - \overline{S/N})^2 + n_{A2} \cdot (\overline{S/N}_{A2} - \overline{S/N})^2 + n_{A3} \cdot (\overline{S/N}_{A3} - \overline{S/N})^2$$

wherein, $n_{A1}$ is the number of experiments with the A factor being A1 in the orthogonal array experiment, and $\overline{S/N}_{A1}$ is the mean S/N ratio of these experiments;

step five: determining the percentage contribution of each factor $P_{factor}$ according to $SS_{Factor}$ and $SS_{Total}$:

$$P_{Factor} = (SS_{Factor}/SS_{Total}) \times 100\%$$

step six: calculating the degrees of freedom of each control factor, the degrees of freedom of each factor is equal to its levels minus 1; the total number of degrees of freedom is equal to the total number of measured values minus 1, the degree of freedom error is the total degrees of freedom minus the sum of the degree of freedom of each factor:

$$DOF_{Total} = n_{exp} - 1$$

step seven: calculating the mean of sum of squares of the factors with the formula:

$$MS = \frac{\text{sum of squares of factors}}{\text{degree of freedom of factors}}$$

step eight: calculating the error mean square of the experimental error factors with the formula:

$$S_e^2 = \frac{\text{sum of square of errors}}{\text{degree of freedom of error factors}}$$

step nine: calculating the importance of each control factor by quantizing the variance ratio F-ratio, the formula of the F-ratio is:

$$F = \frac{MS}{S_e^2} = \frac{\text{mean of sum of squares of control factors}}{\text{error mean square of error factors}}$$

the F value is used to estimate the effect of each factor relative to the 'importance' of the experimental error because the larger the value of F, the lower the correlation between the two is, factors are used in a subsequent S/R ratio prediction only when their 'importance' reaches a definite level and these factors are called 'important factors', conversely, the effects of other factors are regarded as 'infrequent effects' caused by experimental errors and are called 'light factors'.

4. The prediction method according to claim 1, wherein the step of building a preliminary network comprises:

step one: scheduling a network structure by using a back-propagation neural network as a system network, the back-propagation neural network has a three-layer structure: an input layer, a hidden layer and an output layer, wherein the neural element of a single-layer hidden layer is:

$$n_H = \frac{n_{WG}}{n_I + n_O}$$

wherein, $n_H$ is the number of neural elements in the hidden layer, $n_I$ is the number of neural elements in the input layer, $n_O$ is the number of neural elements in the output layer, $n_{WG}$ is the number of neural keys; and the number of neural elements of a network having multiple hidden layers is:

$$n_H = \frac{-(n_O + n_H) + \sqrt{(n_O + n_H)^2 + 4(r-1) \times n_{WG}}}{2(r-1)}$$

wherein, r is the number of hidden layers;

step two: building input modules and output modules of network training examples, after performing a normalization procedure on each combination of the control factors in the Taguchi orthogonal array experiment, the control factors are converted into an input module of training examples of the neural network, after performing a normalization procedure on the S/N ratios of the orthogonal array experiment, the S/N ratios are converted into an output module of training examples of the network, and in the aforementioned L9 orthogonal array, the input module of network training examples comprises probe aperture, exposure energy/μm and developing time, and the output module comprises the S/N ratios of the orthogonal array;

step three: normalizing the input module and the output module, the formula is:

$$D_{nor} = D_{min} + \frac{V_{orig} - V_{min}}{V_{max} - V_{min}}(D_{max} - D_{min})$$

wherein, $D_{nor}$ is the value after the normalization of the input module and the output module, $V_{orig}$ is the original value before the normalization of the input module and the output module, $V_{min}$ is the smallest value before the normalization of the input module and the output module, $V_{max}$ is the largest value before the normalization of the input module and the output module, $D_{min}$ is the smallest value after the normalization of the input module and the output module, and $D_{max}$ is the largest value after the normalization of the input module and the output module;

step four: performing a network training, according to the difference between the expected output value of the network and the actual output value of the network training examples, adjusting the weight between the neural element of the output layer and the neural element of an adjacent layer, and performing this kind of adjustment layer by layer until all the related weights are renewed; and step five: predicting the output module of the network, after performing a network training, inputting the module parameters to be predicted, which comprises the probe aperture, the exposure energy/μm and the developing time, to obtain the normalized values of the predicted S/N ratios, and performing an inverse normalization procedure on the normalized values of the predicted S/N ratios to obtain the true values of the S/N ratios using the formula below:

$$V_{pre} = V_{min} + \frac{(V_{nor} - D_{min}) \cdot (V_{max} - V_{min})}{D_{max} - D_{min}}$$

wherein, $V_{pre}$ is the true value of the predicted S/N ratio, and $V_{nor}$ is the normalized value of the predicted S/N ratio.

5. The prediction method according to claim 1, wherein the step of performing a second stage fine training of the network comprises:

step one: performing a second stage fine training of the network using light factor expansion examples, scheduling the training examples for the fine training of the second stage network based on the assumption of ignoring the effects of the 'light factors', and using the addition model of the Taguchi method on the parameter combination of already executed experiment to calculate the S/N ratios of 'light factors' whose level combinations have not yet been executed, assuming (A B C1) is the already experimented parameter combination and (A B C2) is the parameter combination of the light factors that have not been executed, the S/N ratio is calculated using the following addition module:

$$S/N(A\ B\ C2) = S/N(A\ B\ C1) + C2 - C1$$

wherein, C1 and C2 are the S/N ratios after performing the Taguchi experimental analysis;

step two: increasing the frequency of the training example of the experimental data to emphasize the importance of the information of the experimental data over the light factors.

6. The prediction method according to claim 1, wherein the step of back adding critical experimental training examples comprises:

step one: identifying the 'important factors' and the 'light factors' according to the result of the ANOVA, calculating variance ratios and percentages of the degree of contribution (P %) of each factor, and if the F value is greater than a set confidence level of a variance ratio, then the factor is regarded as 'an important factor', otherwise, it is regarded as a 'light factor';

step two: using the Taguchi addition model to calculate the predicted S/N value of factor combination, predicting the S/N ratios of other not yet executed experimented factor combination according to the S/N ratio data of the orthogonal array experiment and using the linear addition module;

step three: scheduling the second stage expansion training examples according to the 'light factors', and according to the assumption of ignoring the effects of 'light factors', scheduling the second stage network expansion training examples step four: performing the second stage network training, converting the network training examples obtained in the third step to normalized input module of network training and executing the second stage network training;

step five: determining the 'uncertain factor combination' to test the consistent prediction of network inference and Taguchi addition model, all the Taguchi factor combinations are input to the second stage network to perform an all factor test, if the difference between the predicted value of network inference and the predicted value of Taguchi addition model is greater than the experimental error range, the presence of controversy is implied and these groups of factors are judged to be 'uncertain factor combinations'.

7. The prediction method according to claim 1, wherein a half height line width of the near field photolithography line fabrication larger than 100 nm or smaller than or equal to 100 nm is within the range of application.

* * * * *